July 11, 1944.　　F. W. SCHEINEMAN　　2,353,505
CATALYTIC CONVERSION SYSTEM
Filed Dec. 31, 1940　　2 Sheets-Sheet 1

Inventor:
Fred W. Scheineman
By Donald E. Payne
Attorney.

July 11, 1944.　　　F. W. SCHEINEMAN　　　2,353,505
CATALYTIC CONVERSION SYSTEM
Filed Dec. 31, 1940　　　2 Sheets-Sheet 2
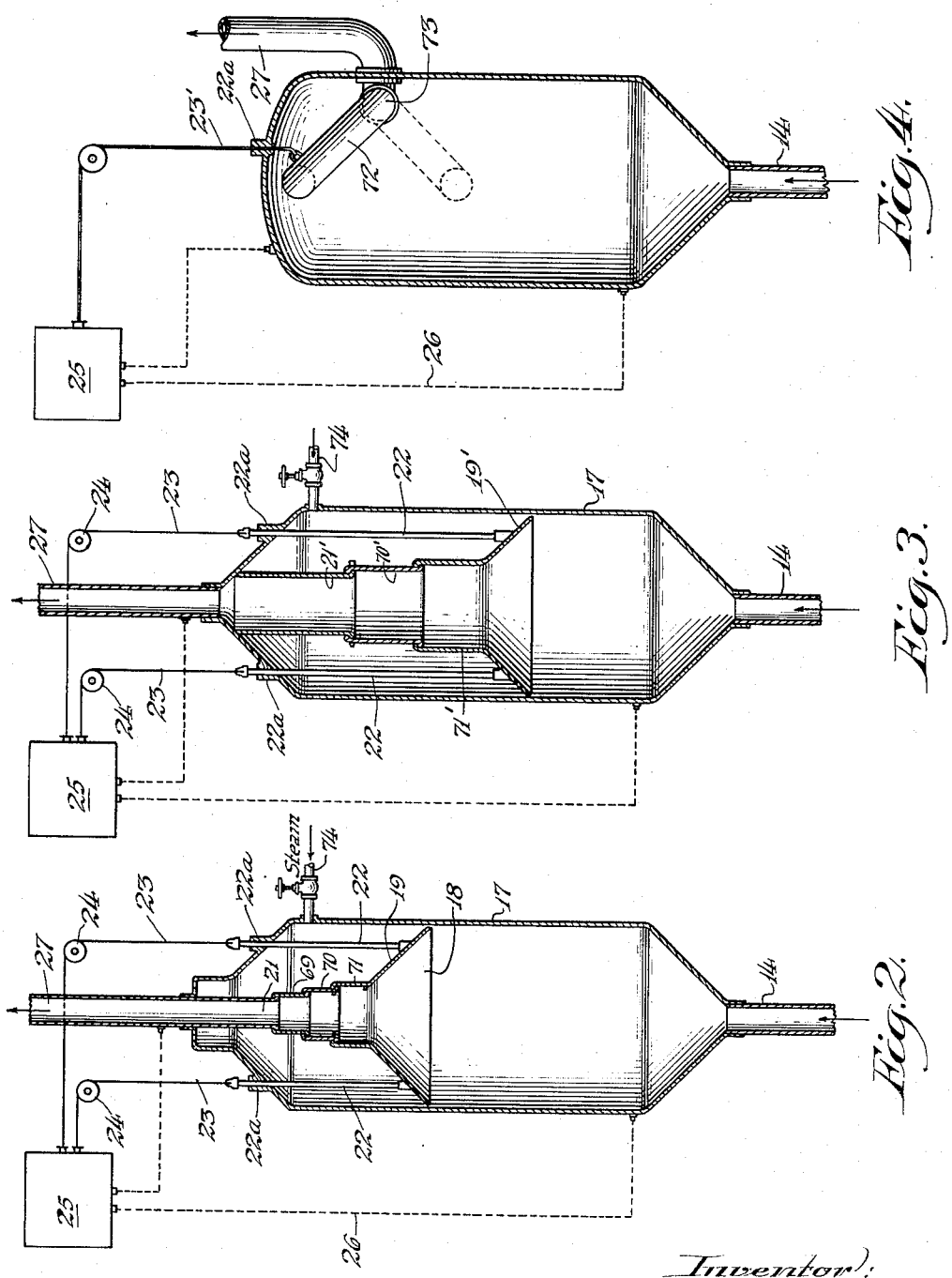
Inventor:
Fred W. Sheineman
By Donald E. Payne
Attorney.

Patented July 11, 1944

2,353,505

UNITED STATES PATENT OFFICE 2,353,505

CATALYTIC CONVERSION SYSTEM

Fred W. Scheineman, Chicago, Ill., assignor to Standard Oil Company, Chicago, Ill., a corporation of Indiana Application December 31, 1940, Serial No. 372,541

11 Claims. (Cl. 196—52)

This invention relates to catalytic conversion systems and it pertains more particularly to conversion systems of the so-called "fluid" type wherein a solid catalyst is employed for endothermic or exothermic reactions while suspended in an upwardly flowing gaseous or vapor stream. The invention is particularly directed to hydrocarbon conversion systems for the manufacture of high quality motor fuel.

In processes of catalytic cracking, hydrogenation, dehydrogenation, aromatization, reforming, isoforming, isomerization, alkylation, desulfurization, polymerization, etc. a hot vaporized hydrocarbon charging stock may be contacted with a solid catalyst while that catalyst is suspended in upwardly flowing reaction vapor steam. During the reaction the catalyst becomes coated with a carbonaceous deposit which impairs its catalytic activity. The coated catalyst may be separated from reaction vapors and suspended in another upwardly flowing stream containing controlled amounts of oxygen and thus regeneration may be effected by burning off the carbonaceous deposit while the catalyst is suspended in hot regeneration gas.

An important consideration in both the reaction and regeneration steps is the density of the suspended catalyst in the gaseous or vapor supported medium. It is essential in the reaction step that vapors contact a sufficient amount of catalyst for a sufficient period of time to effect the desired reaction. The amount of suspended catalyst in a reactor of given size is dependent upon the average density of the catalyst therein which in turn is critically dependent upon the superficial velocity of the supporting gas or vapor in said reactor. In the regeneration step it is essential that the coated catalyst be supplied with a sufficient amount of oxygen for effecting the necessary combustion and a sufficient amount of time must be allowed to permit the burning of the carbonaceous deposit. The amount of suspended catalyst in a regenerator of given size is likewise dependent upon the average density of the catalyst therein which in turn is critically dependent upon the superficial velocity of the regeneration gas in the regenerator. The problem in both reactor and regenerator design is to insure contact of the necessary amount of catalyst for the necessary amount of time with the necessary amount of gases or vapors or, in other words, to obtain the necessary catalyst density and vapor velocity in a reactor or regenerator of sufficient size for effecting the desired conversion.

The catalyst employed may be granular, powdered or pelleted solids of a particle size ranging from about 10 to 400 mesh, usually about 200 to 400 mesh and preferably of fairly uniform size. When such catalyst is introduced at a fairly constant rate in the base of a vertical reactor wherein there is an upwardly flowing gas or vapor stream and the superficial velocity of said stream is varied it will be found that at high velocities the catalyst moves through the reactor at substantially the same velocity as the vapor stream—i. e., there is not a great tendency towards settling. At very low superficial vapor velocities through the reactor the catalyst may settle out of the vapors and assume a quiescent state. At intermediate vapor velocities the catalyst will be carried upwardly with the gas stream but there will be a pronounced tendency toward settling or slipping—i. e. the catalyst will move upwardly in the reactor at a much lower velocity than the supporting stream.

It has been found that with ordinary powdered catalyst ranging in particle size from about 200 to about 400 mesh the catalyst is uniformly distributed throughout the gas stream when the gas stream velocities are in excess of about 5 feet per second, the catalyst particles being suspended as individual particles in a continuous phase of gas. When the superficial gas velocity is decreased to about 2 feet per second the concentration of catalyst in the reactor rapidly increases and the catalyst takes on a "boiling" appearance in which "bubbles" of gas flow upwardly through a liquid-like "dense catalyst phase" in a manner similar to the upward flow of air through a body of water. This settled catalyst takes on the appearance of a new phase, an aerated catalyst phase which may have a density of 10 to 20 pounds per cubic foot. This dense phase becomes more pronounced and more clearly defined as the gas velocity is further decreased but if the gas velocity is sufficiently decreased, portions of the catalyst will become quiescent and those portions of the dense phase will no longer behave as a liquid. In order to maintain a liquid-like, "dense phase" condition the vapor velocity should be at least .2 foot per second and preferably about 1 to 2 feet per second. The velocity required for such dense phase conditions is dependent of course upon the particle size and weight of the catalyst, the diameter of the reactor and perhaps to some extent on the viscosity of the gas or vapor stream although the viscosity of this stream is not of as great significance as has heretofore been assumed.

It appears that when superficial vapor velocities in a reactor are so controlled as to produce a dense catalyst phase there may actually be a rough interface between this lower dense catalyst phase and an upper rarefied phase. Apparently there is some force such as static electricity or surface energy which acts between closely adjacent particles and holds the powdered catalyst in the dense phase condition. The gas which bubbles through this dense phase sweeps catalyst particles therefrom into the upper gas phase and when such particles become dispersed therein they are subject to the laws of behavior as individual particles. With the introduction of catalyst into the dense phase at the same rate at which it is being removed from the top of the dense phase it is possible to maintain a constant level of catalyst in the reactor and to operate in a condition of dynamic equilibrium.

It might be assumed that with such low vapor velocities there would be a tendency toward classification, i. e., for the heavier catalyst particles to settle and escape withdrawal from the upper surfaces. It has been found, however, that with a superficial gas velocity of about 2 feet per second as much as 40% of 30 to 40 mesh particles can be added to the powdered catalyst without the occurrence of such classification. After equilibrium has been reached the heavier particles appear to be swept along in the eddies of relatively dense aerated catalyst and to be drawn from the surface of the dense phase at the same rate as they are being introduced thereto.

A very important feature of the dense phase operation is the uniform temperature which exists throughout all parts thereof. Here again the dense phase apparently behaves like a liquid in which there is sufficient turbulence and convection currents to obtain thorough and intimate mixing so that although gases may be introduced at a temperature of 950° F. the entire dense phase may be at a temperature that is very close to 925° F. when cracking is being effected in a dense phase reactor. Similarly, regeneration temperatures are uniform throughout the entire dense phase and relatively cold gases which are introduced with the oxygen may maintain any substantially uniform regeneration temperature by absorbing the exothermic heat as fast as it is liberated.

In a commercial conversion system employing the above described fluid type up-flow reactor or regenerator for solid catalyst the size and cross-sectional area of the reactor can be determined for obtaining contact with a desired amount of catalyst with the desired amount of vapor for the desired period of time and for maintaining catalyst in the reactor for the desired residence time under any specific set of operating conditions. For any change in reaction conditions or in catalyst activity or in charging stock or in catalyst residence time a very different time of contact or different amount of catalyst in the reactor may be required. An object of my invention is to provide a system which will be sufficiently flexible to meet the requirements of these different operating variables so that the same reactor may be employed for widely varying catalysts, charging stocks and operating conditions.

For example in catalytic cracking processes the degree of conversion, quality of cracked gasoline and product distribution are controlled by a number of variables among which the holding or residence time of the catalyst in the reactor and the holding or residence time of vapor in the reactor (contact time) are of primary importance. In order to permit maximum flexibility in charging various stocks to a given unit, to permit compensation for variation in the activity of the catalyst or in the use of different catalyst, and to provide a system of sufficient flexibility to meet commercial requirements, it is desirable to have a reactor so designed that its volume may be changed without shutting down the plant. An object of my invention is to provide such a reactor.

A further object of my invention is to provide a system for automatically maintaining a predetermined amount of suspended powdered catalyst in a reaction chamber in spite of variations in the catalyst-to-oil ratios in incoming vapors, variations in vapor velocity and catalyst density in the reactor, etc. Other objects will become apparent as the detailed description of my invention proceeds.

In practicing my invention I employ a catalyst reactor of sufficient diameter and size to accommodate the largest amount of catalyst that may be required in processing any oil with any catalyst even when vapor velocities through the reactor are relatively high. I prefer to maintain superficial vapor velocities in the reactor which will be of such order of magnitude as to assure dense phase conditions at the base of the reactor. Under such conditions there is a pressure differential between the bottom and the top of the reactor which is proportional to average catalyst density in the reactor, a large pressure differential being obtained with relatively dense catalyst due to the pressure head of this liquid-like fluent material and a small pressure differential being obtained in case of suspensions of very small density. The approximate level of the dense phase in the reactor may, therefore, be determined by the use of a simple manometer connected to the top and bottom of the reactor and this manometer may actuate control mechanisms for maintaining the dense phase level at any desired position.

In practicing my invention I vary the effective reactor size by varying the level at which gases and suspended catalyst particles are withdrawn from the reactor. The amount of catalyst in the space above the draw-off line is negligible and the amount of catalyst in the reactor may be thus varied in substantially the same way as the amount of liquid might be varied in a storage tank. The level of the dense phase in the reactor may also be controlled by lowering a telescopic conduit which may be provided with a flared conical base which extends approximately to the reactor walls so that the effective cross-sectional area in the upper part of the reactor is sufficiently smaller than that in the lower part of the reactor to increase superficial vapor velocities and thereby maintain a light catalyst phase in the restricted telescopic tube while the dense phase is retained in the base of the reactor. The invention will be more clearly understood from the following detailed description of certain preferred embodiments and from the accompanying drawings which form a part of the specification and in which Figure 1 is a flow sheet illustrating my improved reactors in a catalytic cracking system;

Figure 2 is a schematic vertical section through a reactor containing a telescopic tubular section;

Figure 3 is a schematic vertical section of a telescopic tubular section of different proportions than those illustrated in Figure 2; and Figure 4 is a schematic vertical section of another modification of a reactor with controlled draw-off points.

Figure 1:
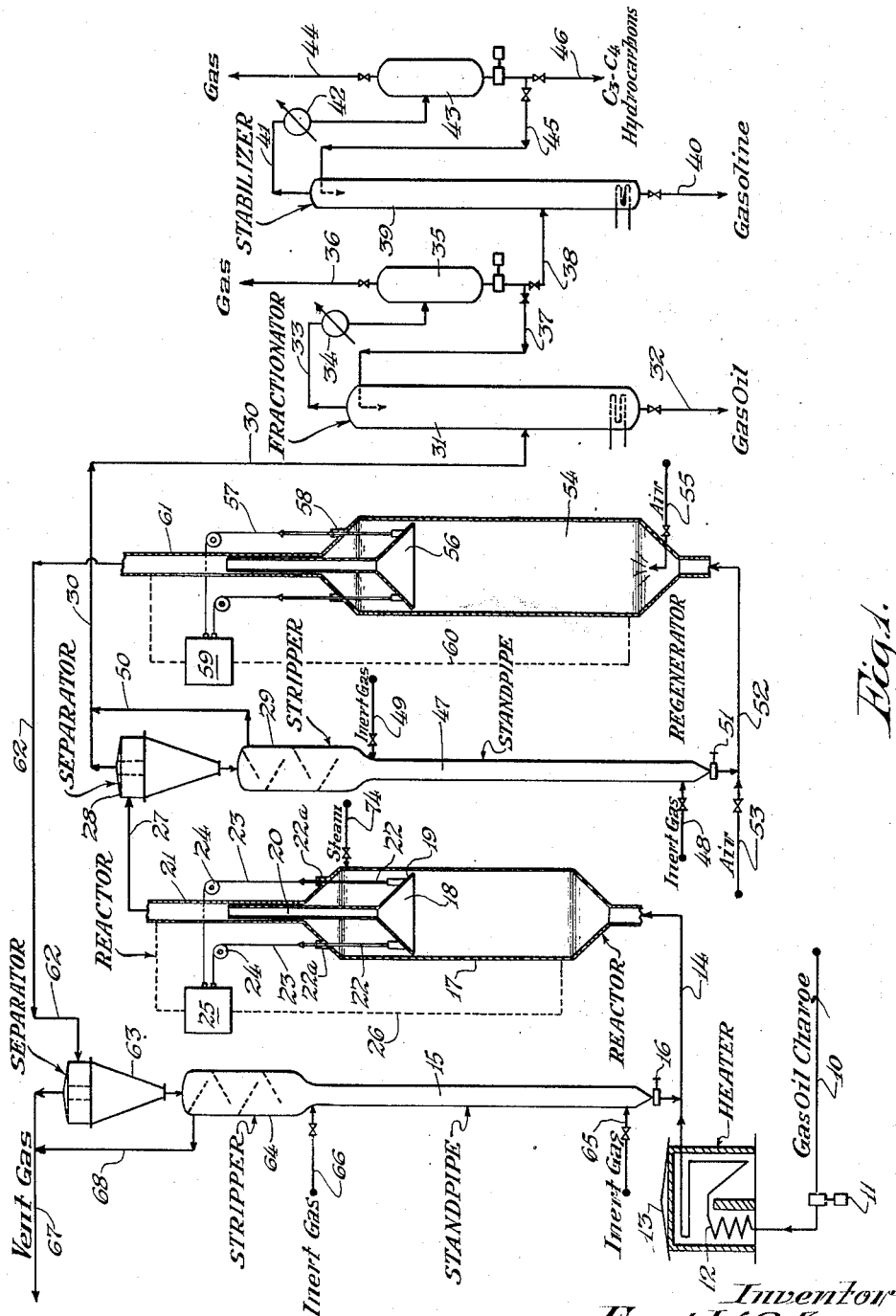

While my invention is applicable to a wide variety of catalytic processes it will be described in connection with the catalytic cracking of gas oil by means of powdered catalyst of the silica-alumina or silica-magnesia type. The silica-alumina catalyst may be an activated bentonite clay such as commercial Super Filtrol. Alternatively, it may be a silica gel having alumina deposited thereon or incorporated therein; such a gel for instance may be prepared by adding water glass to an excess of dilute sulfuric acid containing an aluminum salt, boiling the resulting gel in excess of dilute ammonia, washing, drying and heating to about 1000° F. Another excellent catalyst may be prepared by ball milling silica with calcined magnesite in the presence of water, drying the resulting paste and heating to about 1000° F. The catalysts per se form no part of my present invention and further description of their preparation is unnecessary. They are preferably pulverized and screened to about 200 to 400 mesh size and in compact form they have a bulk density of about .7.

The activity of a catalyst is dependent not only on the composition and method of preparation of said catalyst but also on the amount of time that it has been on stream. Since the amount of catalyst employed in my reactor depends upon the activity of the catalyst there is a relationship between the residence time of the catalyst within the reactor and the total amount of catalyst that must be present in the reactor for effecting a given conversion of a given amount of charging stock. In any event, the amount of catalyst in the reactor is a very important consideration.

Referring to Figure 1, gas oil from line 10 is introduced by pump 11 to coils 12 of pipe still 13 wherein the gas oil is vaporized and discharged through transfer line 14 at a temperature of about 900 to 1050° F., preferably about 950° F., and at about atmospheric to 50 pounds per square inch pressure, preferably about 15 pounds. Powdered catalyst from standpipe or catastat 15 is introduced into transfer line 14 in amounts regulated by star feeder or slide valve 16. I prefer to employ a catalyst-to-oil ratio of about 1:1 to 5:1, for example about 3:1. The powdered catalyst is carried by the vapor stream through transfer line 14 and introduced at the base of reactor 17. A 3:1 catalyst-to-oil ratio corresponds to about .4 pound of catalyst per cubic foot of material introduced into the reactor. It should be understood, of course, that the catalyst may be introduced directly into the reaction chamber by means of steam or conventional catalyst injection devices instead of being introduced with the hot oil charging stock.

Reactor 17 should be of sufficient cross-sectional area so that the vapor velocity therethrough will be of the order of about 1 or 2 feet per second. With larger catalyst particles larger vapor velocities may be used but generally speaking the vapor velocities should be about .2 to 10 feet per second. The height of the reactor should be sufficient to hold the maximum contemplated volume of suspended catalyst which in dense phase condition may have a density of about 10 to 20 pounds per cubic foot. With very low vapor velocities the catalyst density may reach 25 or 30 pounds per cubic foot and with excessively high vapor velocities the catalyst density may be very small.

In order to avoid overtreating and to closely control the amount of catalyst present in the reactor, I provide funnel shaped catalyst draw-off conduit 18 with conical walls 19 which may extend approximately to the inner walls of the reaction chamber 17. The stem 20 of this funnel shaped conduit may slide within pipe 21 so that the funnel shaped discharge line may be raised or lowered for altering the effective size of the reactor. Variable draw-off conduit 20 is suspended in reactor 17 by rods 22 passed through suitable stuffing boxes 22a, and attached to cables 23 trained over pulleys 24 to a driving means 25 which may be an electric motor provided with suitable driving gears and controls. Since the total amount of catalyst in the reactor is indicated by the pressure head of suspended catalyst therein, a manometer 26 or other suitable means for indicating pressure differential may be connected at the top and bottom of the reactor. The motor control means may be directly actuated in response to the pressure differences indicated by the manometer so that the draw-off conduit is automatically raised when the total amount of catalyst in the reactor tends to decrease and is automatically lowered when the amount of catalyst in the reactor tends to increase. The control means may be set for obtaining any desired amount of catalyst in the reactor so that when a very active catalyst is used the dense phase level may be near the bottom of the reactor and when an inactive catalyst is used the dense phase level may be near the top of the reactor. The position of the draw-off conduit 18 may be controlled by gas production or by any other means instead of by the pressure differential in the reactor itself without departing from the spirit of my invention, the important consideration being the control of catalyst volume in the reactor for effecting any desired conversion.

Reaction products together with catalyst particles suspended therein are withdrawn from pipe 21 through line 27 to cyclone separator 28 from which catalyst is dropped into stripping column or hopper 29 and reaction vapors are passed by line 30 to fractionating column 31. It should be understood that I may use a plurality of separators connected in series or parallel and that screens, electrostatic separators or any other conventional means may be employed for removing suspended catalyst from reaction vapors.

The heavier gasoline fraction is withdrawn from the base of fractionator 31 through line 32. Gasoline and lighter components are withdrawn through line 33 and cooler 34 to receiver 35 from which gases may be vented through line 36. The part of the liquid from receiver 35 may be recycled through line 37 to serve as reflux in tower 31 and the rest of this liquid is introduced by line 38 into stabilizer tower 39.

Gasoline is withdrawn from the base of the stabilizer through line 40. Gases are taken overhead through line 41 and cooler 42 to receiver 43 from which uncondensed gases are vented through line 44. A part of the $C_3$–$C_4$ hydrocarbons may be recycled through line 45 for use as reflux in the stabilizer and another part may be withdrawn through line 46 to storage or to some other conversion system.

The spent catalyst drops from stripping column 29 to the standpipe or catastat 47 which may be aerated and maintained in fluid liquid-like form by means of an aerating gas introduced through line 48. Aerating gas may likewise be introduced at other points along the standpipe and additional stripping gas may be introduced through line 49 at the base of the stripping column. Stripped hydrocarbons may be passed through line 50 to line 30.

Spent catalyst from the base of standpipe 47 may be discharged through a slide valve or star feeder 51 into conduit 52 through which it is carried by an oxygen-containing gas introduced through line 53 to regeneration chamber 54. Additional air may be introduced directly into the chamber through line 55 and if desired the catalyst may likewise be introduced directly into the chamber and there subjected to the up-flowing regeneration gas.

The regeneration chamber 54 may be of the same general structure as reaction chamber 17. It should be of sufficient diameter to insure a superficial gas velocity of about .2 to 10, preferably about 1 or 2, feet per second and it should be of sufficient size to allow enough time for the burning of the carbonaceous deposit from catalyst particles. If there is only a small amount of carbon on the catalyst and small regenerator volume is desirable, the funnel shaped discharge conduit 56 may be lowered by means of rod and cable supporting means 57 which pass through stuffing boxes 58, said cables being actuated by a conventional motor drive 59 which is controlled in accordance with the pressure differential indicated by manometer 60 or other conventional means.

Regenerated catalyst is carried by regeneration gases through pipe 61 and line 62 to cyclone separator 63 from which the hot regenerated catalyst is dropped into a hopper or stripping column 64 and thence to the top of standpipe or catastat 15. An inert aerating gas such as steam may be introduced at the base of this standpipe through line 65 and may similarly be introduced at various points along this standpipe. Additional stripping gas may be introduced through line 66. Hot regeneration gases are withdrawn from separator 63 through line 67 and stripping gases are withdrawn from column 64 through line 68. These gas streams may pass through any suitable heat exchangers, means for recovering last traces of catalyst, means for generating power, etc.

In Figure 2 I have illustrated a modified type of catalyst draw-off conduit. Instead of telescoping the conduit inside pipe 21 I extend this pipe into the reactor and arrange telescoping sections 69, 70 and 71 outside thereof. In general, however, this modification is operated exactly as the modification described in connection with Figure 1.

In Figure 3 I disclose a further modification in which the inwardly extending conduit 21' is of relatively large cross-sectional area. A sufficient number of telescoping sections 70' and 71' are employed so that the bottom portion 19' may be lowered approximately to the base of the reactor. By this means I effectively decrease the cross-sectional area in all but the lowermost part of the reactor and thereby increase vapor velocities which, in turn, brings about a lowering of catalyst density and a decreasing of the amount of catalyst retained in the reactor. In this modification I may produce a heavy dense phase at the base of the reactor and a lighter dense phase in the upper part of the reactor due to the increase in vapor velocity which is effected by my telescoping draw-off conduit.

My invention is not limited, however, to telescoping draw-off conduits since any equivalent structure may be employed. For example, in Figure 4 I have illustrated a draw-off conduit 72 which is pivotally connected at 73 to the end of line 21. The pivotally mounted draw-off line may be raised or lowered by wire or cable 23' in accordance with the pressure differential in the reactor as has been heretofore described. When gases or vapors together with suspended catalyst are withdrawn through conduit 72 while in its lowered position, the upper part of the reactor contains no appreciable amount of catalyst material. Consequently, the total amount of catalyst in the reactor during any on-stream period may be regulated by raising and lowering this discharge line.

Where it is desired to prevent catalyst from entering the space between the draw-off conduit 18 and catalyst chamber walls I may introduce steam or other inert gas through line 74.

By providing a reactor of uniform diameter and variable height I can maintain a constant vapor velocity in the base of the reactor and thus maintain a substantially constant catalyst density in the reactor. By raising or lowering the catalyst discharge conduit in the upper part of the reactor I can control the actual amount of catalyst in the reactor without disturbing dense phase conditions at the base. I thus accomplish the object of my invention and have provided a flexible catalytic conversion system wherein the amount of catalyst in the reactor may be changed without interrupting the flow in the system and without changing the critical vapor velocities in the base of the reactor which are essential for the formation and maintenance of the desired dense phase conditions.

The practice of my invention will not interfere with temperature control that may be necessary particularly in the regenerator. Most catalysts are impaired if regeneration temperatures exceed 1050 or 1100° F. When large amounts of carbonaceous deposits have to be burned from the catalyst some means must be provided for absorbing or dissipating heat of combustion. A certain amount of such heat may be absorbed by recycling relatively cool flue gas provided that such recycling will not result in unduly large vapor velocities. A more feasible method of temperature control is the recycling of cooled regenerated catalyst to the regenerator for absorbing a part of the heat of combustion. Heat exchange tubes or coils may be mounted in the base of the reactor or regenerator chambers and any suitable heat exchange fluid may be passed therethrough for obtaining the desired temperature control. Such expedients are familiar to those skilled in the art and require no further description.

While I have disclosed preferred embodiments of my invention, other modifications and equivalents will be apparent to those skilled in the art from the above detailed description. In the system hereinabove described both the conversion and the regeneration are chemical reactions and therefore the term "reactor" as used in the appended claims is intended to cover and is hereby defined as covering both conversion reactor 17 and regenerator reactor 54.

I claim:

1. In a catalytic conversion system of the dense-phase powdered catalyst type the method of controlling the amount of catalyst in a reaction zone in a reaction of fixed overall dimensions without disturbing superficial vertical gas or vapor velocities at the base of said zone which method comprises varying the effective height of said reaction zone by varying the level at which catalyst is removed from said zone without changing the overall dimensions of the reactor.

2. In a hydrocarbon conversion system wherein the charging stock is vaporized and heated to a temperature of about 900 to 1050° F. and introduced at the base of an up-flow reaction zone together with powdered catalyst, the method of controlling the amount of catalyst which is contacted by said vapors in said reaction zone which comprises maintaining such a superficial vapor velocity in the base of said reaction zone that a dense catalyst phase will be formed in said zone and regulating the depth of said dense catalyst phase in said zone in accordance with the pressure differential from the top to the bottom of said zone.

3. In a hydrocarbon conversion system wherein a powdered catalyst effects conversion by contacting an upflowing hydrocarbon stream, is separated from reaction vapors and subsequently contacted with upflowing regeneration gas and is finally separated from the regeneration gases and again contacted with hydrocarbon vapors for further conversion, the improved apparatus which comprises an enlarged vertical chamber, a fixed conduit at the base of said chamber for introducing a gaseous suspension of powdered catalyst, a fixed conduit at the upper part of said chamber for withdrawing a gaseous suspension of powdered catalyst, said fixed conduits being of small cross-sectional area as compared with the cross-sectional area of the chamber, a separate conduit slidable in the upper of said fixed conduits, means for moving said slidable conduit from a position in which it is substantially surrounded by the upper fixed conduit to a position in which only a part of the slidable conduit is surrounded by the upper fixed conduit and a substantial part projects into said chamber and means for adjusting the position of said sliding conduit in said upper fixed conduit.

4. The apparatus of claim 3 which includes a funnel-shaped member secured to one end of the slidable conduit and extending therefrom substantially to the walls of said chamber.

5. In a catalyst conversion system an up-flow reactor, means for introducing powdered catalyst and a suspending gas at the base of said reactor, means for withdrawing catalyst and gas from the upper part of said reactor and means including a telescopic conduit communicating with the catalyst withdrawal means for changing the effective height and volume of the reactor.

6. In a catalytic conversion system wherein powdered catalyst is maintained as a dense catalyst phase in an upflowing gas or vapor stream, the improved apparatus which comprises a vertical reactor, means for introducing powdered catalyst and a gas into said reactor, means for withdrawing catalyst and gas from said reactor, means for indicating the pressure differential between the pressure at the top of the reactor and the pressure at the bottom of the reactor whereby the amount of catalyst in the reactor may be ascertained and means for varying the level at which catalyst is removed from the reactor in accordance with the indicated pressure differential.

7. The apparatus of claim 6 which includes means for automatically varying level of catalyst removal in accordance with the indicated pressure differential.

8. In a hydrocarbon conversion system wherein charging stock vapors are passed upwardly through a conversion zone at conversion temperature and pressure through a dense phase of powdered catalyst and wherein powdered catalyst is continuously added to said dense phase and powdered catalyst is continuously removed therefrom, the method of controlling the amount of catalyst which is contacted by said vapors in said zone which method comprises employing a vertical vapor velocity in said zone which is effective for maintaining catalyst in dense phase and regulating the depth of the dense catalyst phase in said zone in accordance with the pressure differential between the pressure at the top of said zone and the pressure at the bottom thereof.

9. In a catalyst system wherein gases are passed upwardly through a contacting zone through a dense phase of powdered catalyst and wherein powdered catalyst is continuously added to said dense phase and powdered catalyst is continuously removed therefrom, the method of controlling the amount of catalyst which is contacted by said gases in said zone which method comprises employing a vertical gas velocity in said zone which is effective for maintaining an interface between the dense catalyst phase and an upper rarefied phase, raising the level of said interface when the density of the dense catalyst phase is below a desired minimum and lowering the level of said interface when the density of the dense catalyst phase is above a desired maximum.

10. In a catalytic conversion system wherein gases are passed upwardly through a contacting zone through a dense phase of powdered catalyst and wherein powdered catalyst is continuously added to said dense phase and powdered catalyst is continuously removed therefrom, the method of operation which comprises employing a vertical gas velocity in said zone within the approximate range of .2 to 5 feet per second for maintaining a dense phase catalyst density within the approximate range of 10 to 30 pounds per cubic foot, and maintaining a substantially constant amount of catalyst in said contacting zone by increasing the effective height of said zone when catalyst is removed therefrom at a more rapid rate than it is introduced thereto and decreasing the effective height of said contacting zone when catalyst is introduced thereto at a more rapid rate than it is removed therefrom.

11. In a catalytic conversion system a vertical cylindrical chamber of relatively large cross-sectional area, a fixed conduit at the bottom of said chamber for introducing suspended powdered catalyst and a suspending gas upwardly into said chamber, a fixed conduit at the top of said chamber for withdrawing suspended powdered catalyst and gases from said chamber, a false head vertically movable inside of said chamber and a movable conduit secured to said false head and communicating with said chamber through said false head, said last named conduit being slidably mounted in one of said fixed conduits and communicating therewith.

FRED W. SCHEINEMAN.